(12) United States Patent
Keller

(10) Patent No.: US 6,254,058 B1
(45) Date of Patent: Jul. 3, 2001

(54) SPRING RETURNING A ROTARY VALVE WITH A DIFFERENTIAL PLANETARY DRIVE

(75) Inventor: Robert D. Keller, Davisburg, MI (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 09/557,652

(22) Filed: Apr. 25, 2000

(51) Int. Cl.⁷ .................................................. F16K 31/44
(52) U.S. Cl. ........................................ 251/69; 251/129.11
(58) Field of Search .......................... 251/66, 69, 129.01, 251/129.11; 475/5, 149

(56) References Cited

U.S. PATENT DOCUMENTS

| | | | |
|---|---|---|---|
| 5,117,784 | * | 6/1992 | Schechter et al. ................. 123/90.17 |
| 5,182,498 | * | 1/1993 | Stuhr ...................................... 318/15 |
| 5,230,411 | * | 7/1993 | Nishida et al. ...................... 192/48.8 |
| 5,634,842 | * | 6/1997 | Becker .................................. 451/155 |
| 5,988,319 | * | 11/1999 | Hudson et al. ..................... 185/40 R |

\* cited by examiner

*Primary Examiner*—Joseph A. Kaufman
*Assistant Examiner*—D H Bonderer
(74) *Attorney, Agent, or Firm*—Roger A. Johnston

(57) ABSTRACT

A rotary diverter valve assembly having a low voltage low current drive motor driving the rotating valve shaft through a differential planetary gear train. The motor drives the sun gear which engages a first pitch diameter set of teeth on the carrier mounted orbiting planetary gears, the first set of planetary gear teeth also is engaged by a fixed outer ring gear. A second lesser pitch diameter set of coaxial teeth are provided on the planetary gears which engage an output ring gear attached to the rotary valve shaft. A torsion spring has one end attached to the planetary carrier and is wound up by the relative rotation of the carrier with respect to the sun gear during motor operation. In the event of motor failure during operation, the stored energy of the wound spring applies a torque to back rotate the carrier and effect rotation of the valve member to its initial position.

11 Claims, 6 Drawing Sheets

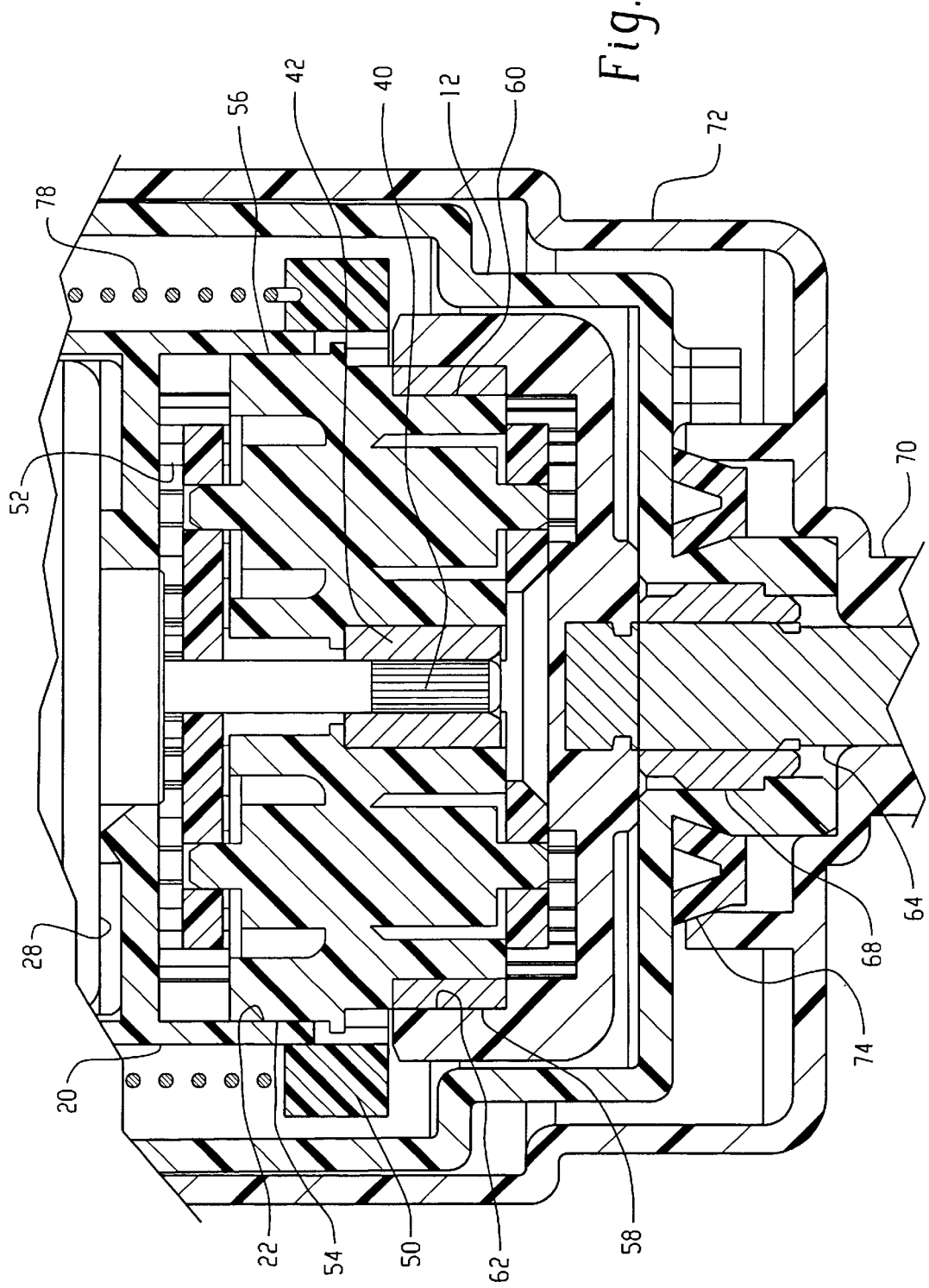

MATCH TO FIG. 5B

SPRING RETURNING A ROTARY VALVE WITH A DIFFERENTIAL PLANETARY DRIVE

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to servomotor operated rotary valves and particularly valves of the type intended for on-board motor vehicle application such, as for example, valves employed for diverting flow of air as between plural passages in an engine inlet manifold.

Currently some automotive engines employ different length passages in the inlet manifold for producing different flow characteristics in different regimes of the engine speed/load envelope and a motorized diverter valve is employed for switching air flow from one set of passages to another as the flow requirements of the engine are increased with increasing load and/or speed. The motorized diverter valve for such an application must, of necessity, be small in volume and have a minimal current draw, yet provide fast response in order that the diverter valve can adequately respond to operator throttle input demands. In a typical passenger car or light truck application the engine electronic computer for generating an electrical control signal to drive the diverter valve motor.

Furthermore, it is required to have a high degree of accuracy in positioning the valve during rotation in order to achieve the desired precise amount of flow diversion for engine inlet air in order that the engine operation may be optimized without adversely effecting the combustion and resultant emissions. The electronic engine computer also controls the electrically operated fuel injectors with an algorithm which includes throttle position as an input.

Thus, it has been desired to have a small low current motor for an engine manifold diverter valve capable of operating on a typical low voltage direct current vehicle power supply and which can provide desired accuracy of valve positioning, quick response and sufficient torque to move the valve readily to the desired operating position. Heretofore, this has been achieved by using a gear reduction train with a numerically high overall ratio of a motor input shaft rotation to output valve shaft rotation.

However, it has also been a requirement that such a rotary diverter valve for engine air inlet manifold applications have a provision for return to an initial rotational position in the event of servomotor failure or loss of electrical power once the valve has been rotated from the initial position to an operational air diverting position. However, where a high numerical ratio of speed reduction has been provided between the motor input shaft and the valve shaft, it has been found virtually impossible to provide a spring return for the valve inasmuch as the return spring must have adequate stored energy from winding to back drive the motor shaft through the mechanical disadvantage of the gear train when driven by applying the spring torque to the valve shaft.

Thus, it has long been desired to provide a way or means of spring returning a motor driven rotary diverter valve drivers by a small low current having a high numerical gear reduction in a manner which does not require a heavy return spring resulting in additional drive motor loading in order to overcome the torque of the return spring.

The motorized diverter valve for such engine applications must also be reliable and relatively low in manufacturing cost so as not to render the desired engine control prohibitively costly for high-volume, mass-produced vehicle engines.

BRIEF SUMMARY OF THE INVENTION

The present invention provides a servomotor operated rotary diverter valve having a small subfractional horsepower low voltage drive motor driving the rotary valve through a gear train having a numerically high reduction for providing accurate positioning of the diverter valve and has provision for spring returning of the diverter valve to an initial position in the event of motor failure during operation of the valve.

The servomotor driven rotary diverter valve of the present invention has particular suitability for an engine air inlet manifold diverter application and provides a relatively high degree of positional accuracy for the diverter valve, relatively low manufacturing cost, reliability and compact design.

The servomotor driven valve of the present invention utilizes a differential planetary gear train with the servomotor driving the sun gear and the torsion return spring biased directly to the planetary carrier for providing return spring drive to the carrier for returning the valve to the initial position in the event of a motor failure during operation.

The servomotor driven diverter valve of the present invention utilizes a planetary drive having the motor driving a sun gear engaging a first set of teeth on the carrier mounted planetary gears, which first set of teeth also engage an output ring gear connected to the valve shaft. A second set of teeth are provided coaxially mounted on each of the planetary gears and have a greater pitch diameter than the first set of teeth which second set of teeth engage a fixed ring gear. The arrangement of the differential planetary gears enables the motor to wind a low spring rate torsion spring during motor operation. The return spring is wound by rotation of the planetary carrier to store enough energy to rotate the carrier if the motor operation ceases; and, the carrier is then able to drive the output through the second stage reduction to return the valve to the initial position. The gear reduction between the motor driven sun gear and the first stage planetary reduction is sufficient to enable a low current subfractional horsepower motor to drive the planet carrier and wind the return spring.

The present invention thus provides a solution to the above-described problem of providing a high degree of accuracy of positioning of a rotary diverter valve from a small low current low voltage drive motor with a numerically high ratio of input shaft speed reduction in a compact configuration and yet provides for spring return of the rotary valve member in the event of motor failure during operation without the use of a heavy return spring and increased motor power requirement.

BRIEF DESCRIPTION OF THE DRAWINGS

FIG. 4 is an enlarged view of a portion of FIG. 2; and,

DETAILED DESCRIPTION OF THE INVENTION

Figure 1:
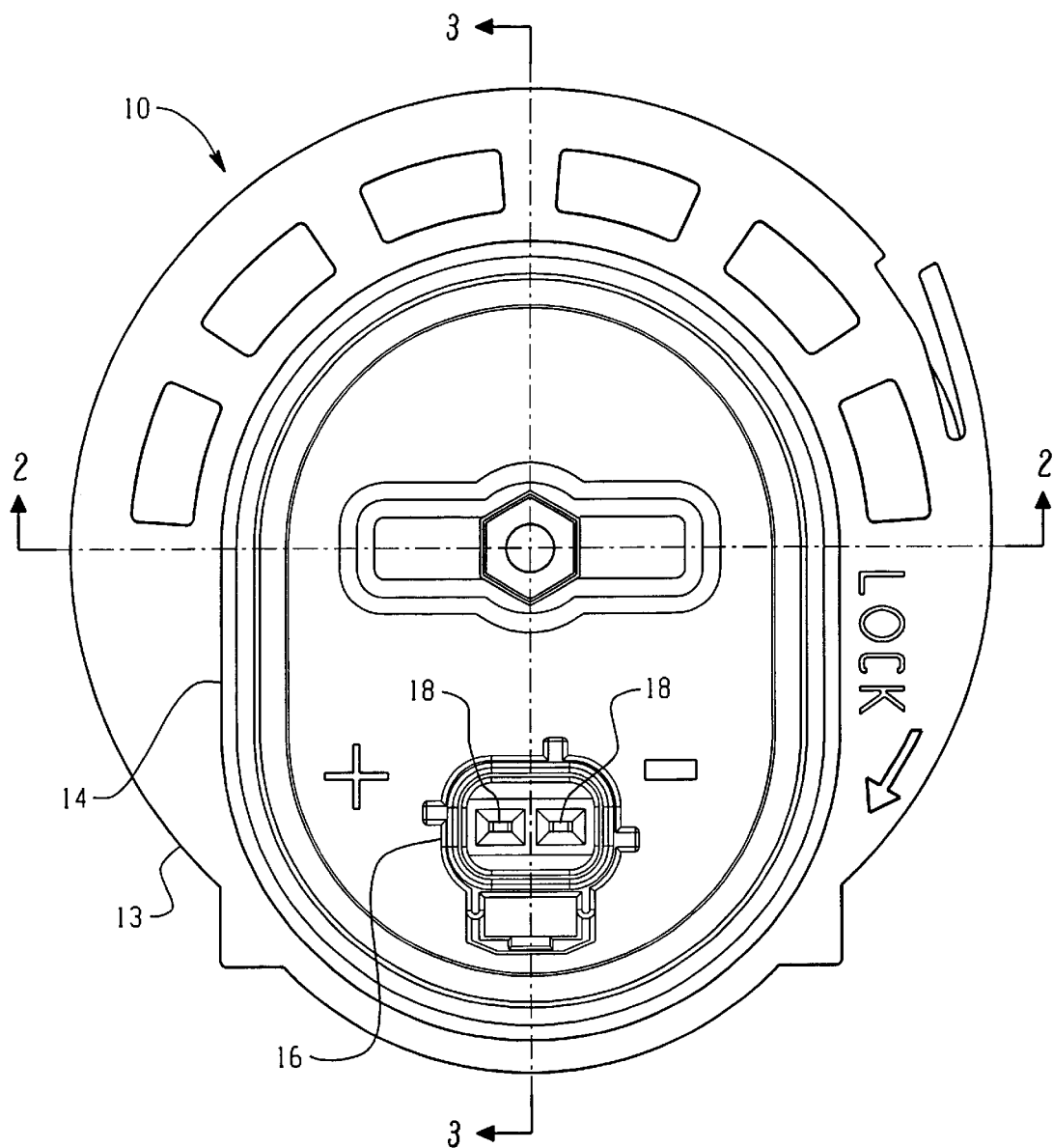
FIG. 1 is a top view of the servomotor driven valve assembly of the present invention.
Figure 2:
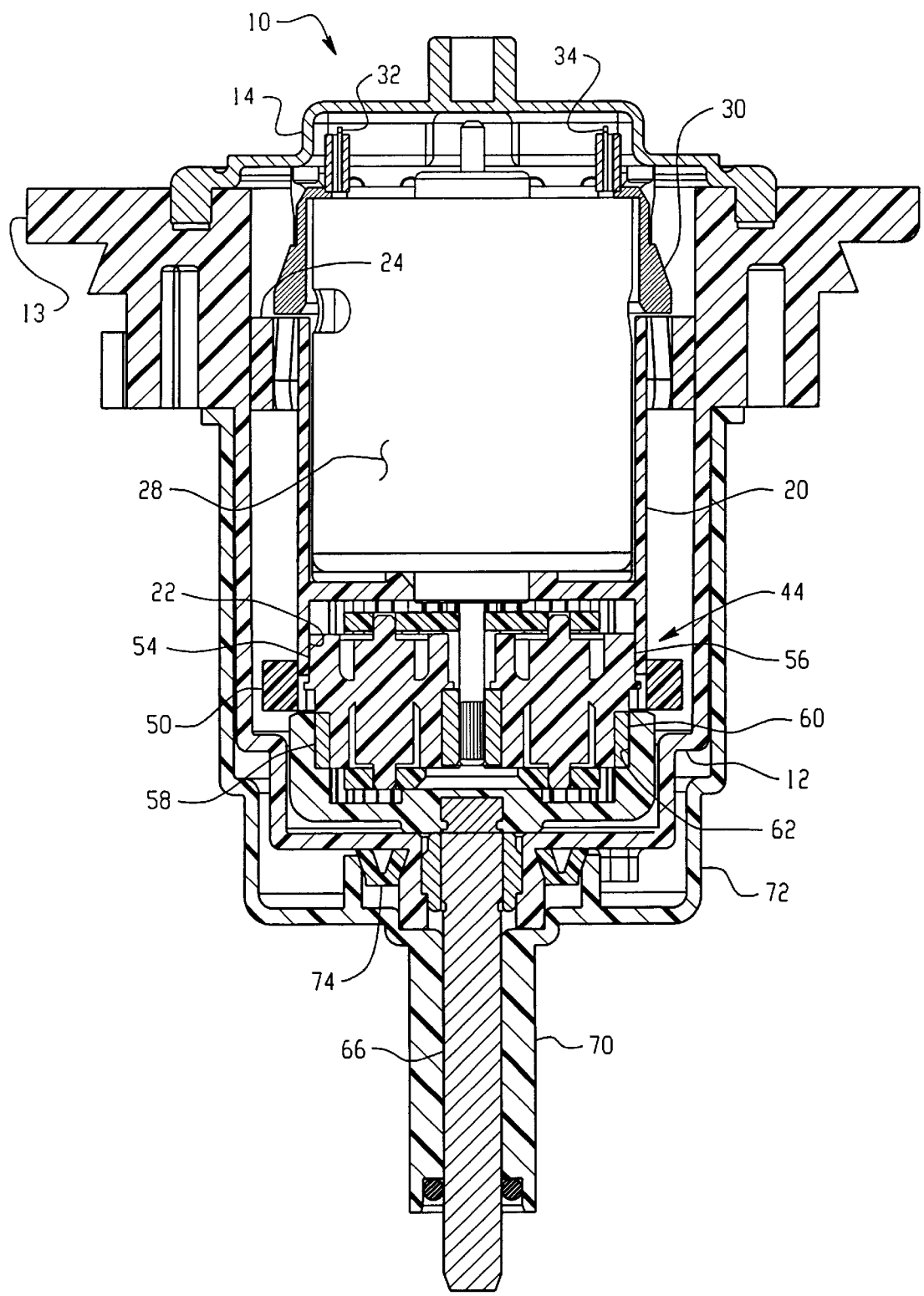
FIG. 2 is a cross-section taken along section indicating lines 2—2 of FIG. 1.
Figure 3:
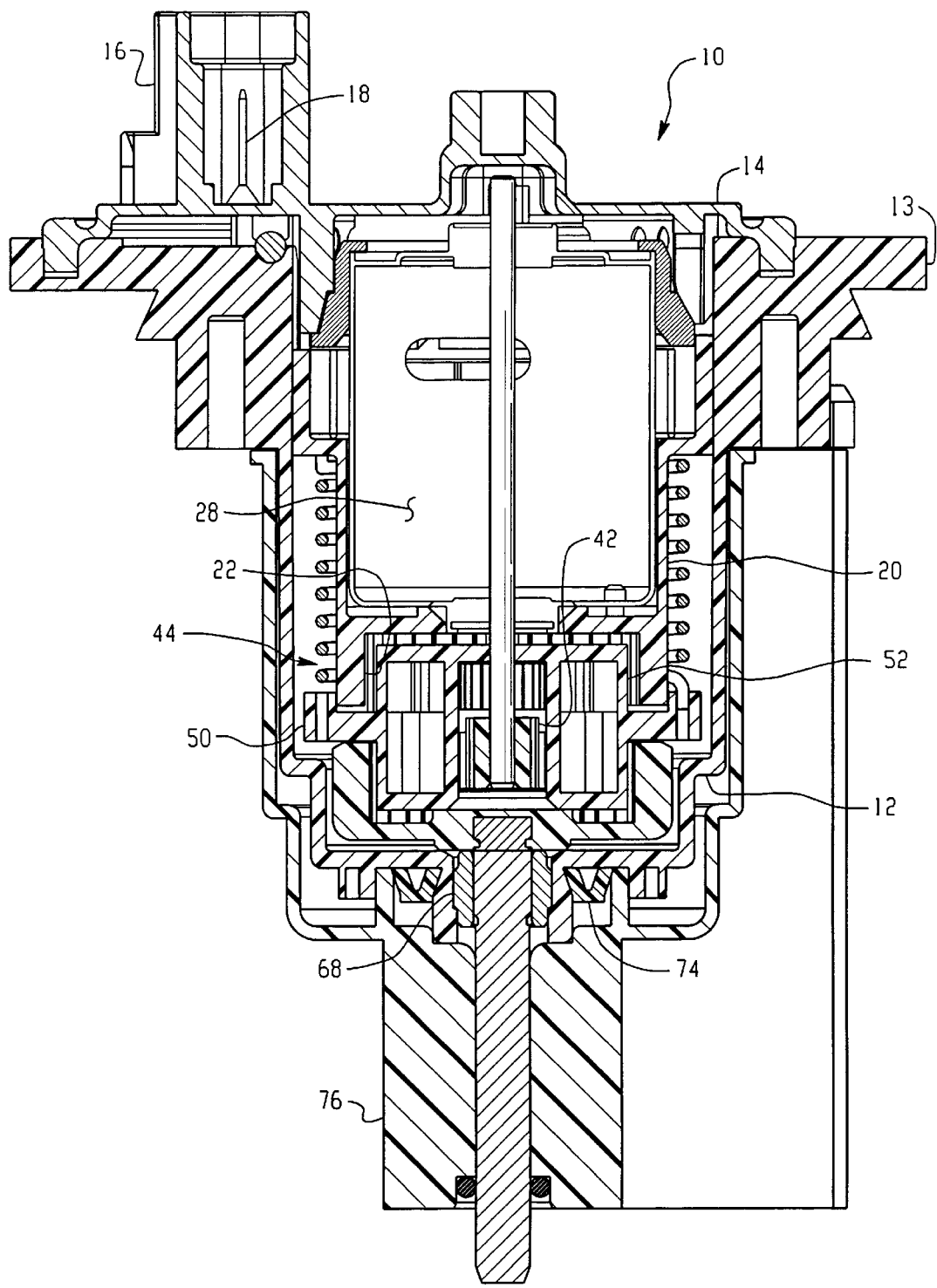
FIG. 3 is a cross-section taken along section indicating lines 3—3 of FIG. 1.
Figure 5A:
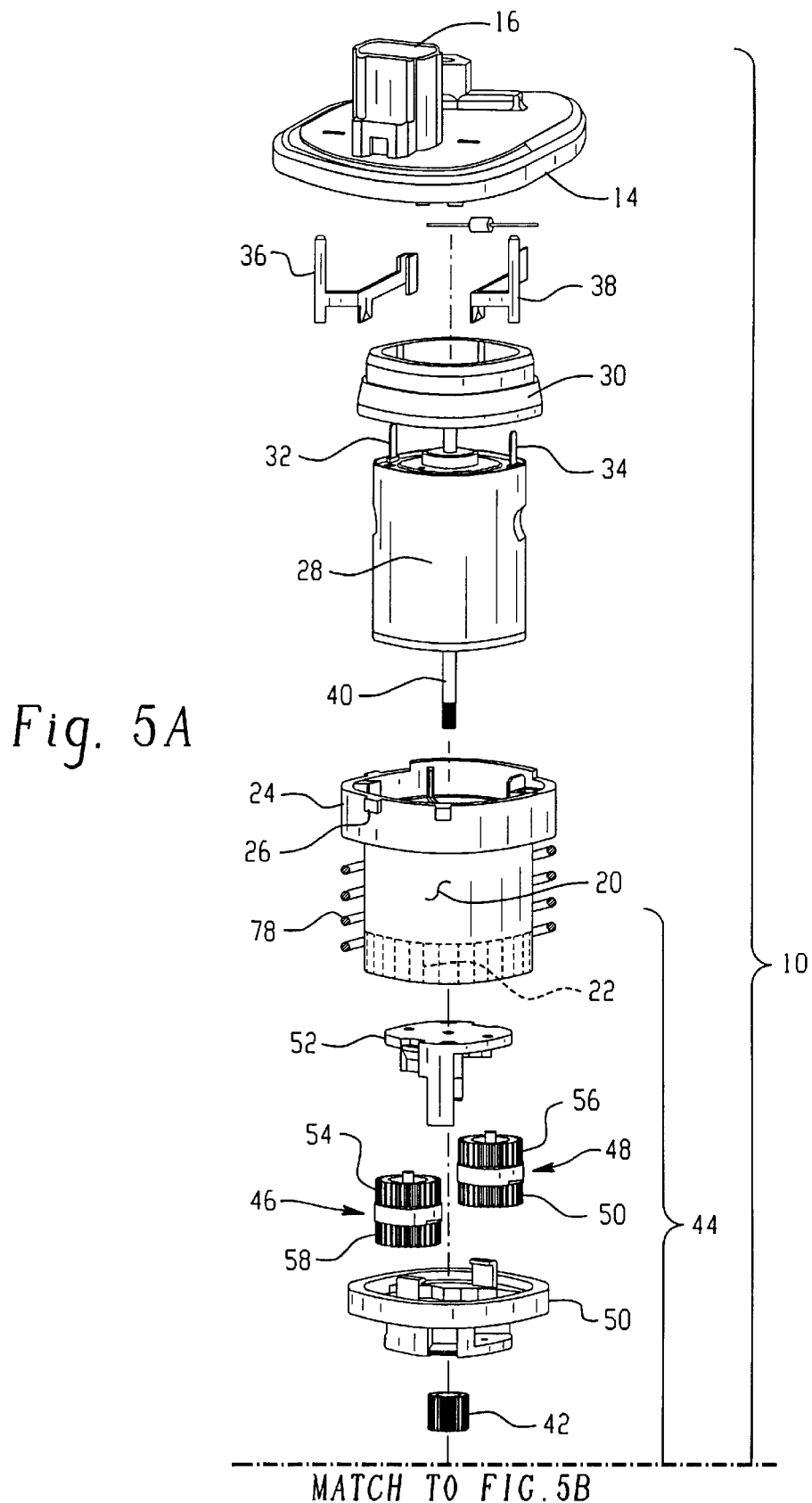
FIG. 5 is an exploded view of the valve assembly of FIG. 1.
Figure 5B:
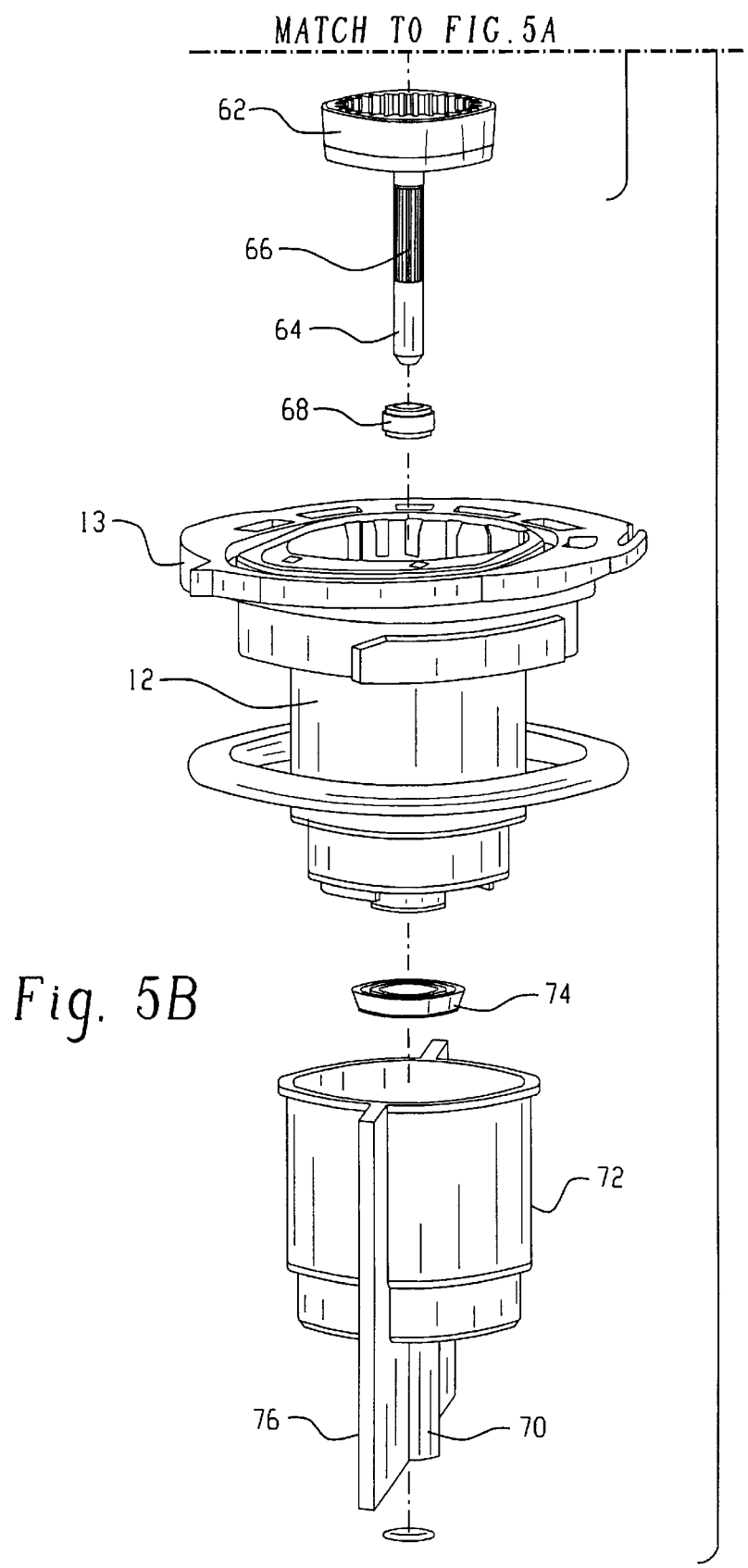

Referring to FIGS. 1 through 5, the servomotor operated valve assembly of the present invention is indicated generally at 10 and includes a housing 12 with a mounting flange 13 and having a cover 14 with an electrical receptacle 16 having connector pins 18 provided therein for attachment to a mating wiring harness connector (not shown).

A motor mounting sleeve 20 is disposed within housing 12 and has formed in the lower end thereof an internally toothed fixed ring gear 22 which it will be understood remains stationary with the sleeve 20. An enlarged diameter flange portion 24 is formed at the upper end of sleeve 20 and secured in the housing in a non-rotatable manner by engagement of lugs 26 provided in corresponding recesses in the housing.

A direct current drive motor 28 preferably comprising a subfractional horsepower low voltage low current motor capable of operating an on-board vehicle power supply is received in sleeve 20 and retained therein by a suitable retaining ring 30 engaged thereover with motor connector terminals 32, 34 extending axially therethrough. Terminal strips 36, 38 are connected respectively thereto and to the terminal pins 18 in the receptacle 16.

Motor 28 has its shaft provided with the splined end 40 which engages in a driving manner the interior of a sun gear or motor pinion 42 which provides the power input to the gear train indicated generally at 44. A plurality of planetary gears indicated generally at 46, 48 each have a first or primary set of teeth 54, 56 respectively which are engaged with fixed ring gear 22. Planetary gears 46, 48 are journalled on a planetary carrier comprising annular member 50 and retainer 52, preferably snap-locked thereon. Each of the planetary gears 46, 48 has respectively thereon a second or output set of teeth 58, 60 disposed coaxially with the input teeth 54, 56. The output set of teeth 58, 60 have a lesser pitch diameter than the teeth 54, 56; and, the output teeth 58, 60 engage an output ring gear 62 which is drivingly connected to output shaft 64. It will be understood that the output ring gear 62 has a pitch diameter less than the pitch diameter of fixed ring gear 22 in view of the lesser pitch diameter of teeth 58, 60. It will be understood by those skilled in the art of planetary drives, that there is a difference in the ratios between the first stage comprising sun gear driving the planetary gears 46, 48; and, the secondary stage comprising the second stage teeth on the planetary gears driving the output shaft 64, thereby preventing the planetary carrier from rotating without transmitting torque from the sun gear 42 to the output ring gear 62. Alternatively it will be understood that output teeth 58, 60 could be larger than input 54, 56 resulting in reverse rotation of output ring gear if desired.

The output ring gear 62 has its shaft 64 journalled in a bearing 68 received in the lower end of housing 12. Shaft 64 has provided thereon a spline 66 which engages the hub 70 of a generally cup-shaped valve rotor 72 which is nested over housing 12 and rotationally sealed thereabout by resilient ring seal 74. Rotor 72 has formed thereon a valve member in the form of a vane 76 which is adapted for insertion into an unshown valving chamber and particularly such a chamber within an engine air inlet manifold.

A torsion return spring 78 is disposed about sleeve 20 and has one reaction end thereof anchored to carrier 50 and the opposite end anchored in sleeve flange 24. Alternatively torsion spring 78 could be a clock or constant rate spring. It will be understood that, as the carrier is rotated by motor 28 driving sun gear 42, spring 74 is wound by the rotation of the carrier relative to the sun gear. In the event of motor failure with the output ring gear 62 rotated from its initial position, the windup energy stored in the spring 78 is operable to apply a torque to drive carrier 50 in the opposite direction thereby rotating the ring gear 62 and returning valve member 76 to its initial position.

In the presently preferred practice of the invention the overall ratio of the gear train 44 is about 76 to 1; and, the torsion return spring 78 is wound about 4 turns by the planetary carrier 50 upon the motor effecting about 90° angular rotation of the output ring gear 62. The spring 78 has been found to function satisfactorily with about 0.12 inch pounds of torque preload at assembly; and, in one form was formed of wire having a diameter of about 0.024 inches (0.61 mm) and a coil diameter of about 1.8 inches (46 mm).

In the present practice of the invention, for an engine air inlet manifold diverter valve application it has been found satisfactory to use a fixed ring gear 22 having 50 teeth, a sun gear 42 having 12 teeth, a first planetary gear 54, 56 having 20 teeth, a second or output planetary gear 58, 60 having 18 teeth and an output ring gear 62 having 48 teeth.

The first stage reduction then has a ratio $$R_1 = 1 + \frac{(N_{22} \times N_{58,60})}{(N_{54,56} \times N_{42})} = 1 + \frac{(50 \times 18)}{20 \times 12}$$
$$= 1 + 3.75 = 4.75$$

where N is the number of teeth on the particular gear. The carrier thus makes one revolution for each 4.75 revolutions of the sun gear 42 on the motor shaft.

The second step reduction has a ratio $$R_2 = \frac{1}{\left[1 - \frac{(N_{22} \times N_{58,60})}{(N_{54,56} \times N_{62})}\right]} = \frac{1}{\left[1 - \frac{(50 \times 18)}{(20 \times 48)}\right]} = \frac{1}{[1 - 0.9375]};$$

$$R_2 = \frac{1}{0.0625}$$
$$= 16;$$

and, thus, the planetary carrier rotates 16 turns for each revolution of the output ring gear 62. It will be understood that the overall reduction $R_0 = R_1 \times R_2 = (4.75 \times 16) = 76:1$. The present invention, having the aforesaid number of teeth for the particular gears thus enables the motor to have a 76:1 mechanical advantage for rotating vane 76 and has a 4.75:1 mechanical advantage in winding spring 78. In the foregoing example of the present invention, as applied to an engine inlet manifold diverter valve, when spring 78 is wound about four turns by the motor in opening the vane 76 by 90° rotation, the spring exerts about 0.25 inch pounds of torque on carrier 50 which, having a 16:1 reduction to the vane, provides four inch pounds of torque to return the same to its initial position.

The present invention thus provides a dual stage planetary gear drive for the rotary valve member with the intermediate carrier winding the return spring, which, upon motor failure applies its stored energy to the intermediate carrier and utilizes the second stage reduction mechanical advantage to return the valve to its initial position. A particular embodiment is described with specific teeth sets providing the drive reduction suitable for an engine inlet manifold application; however, it will be understood that the number of teeth on the gears may be varied to provide different desired reduction ratios. For example, if the planetary gears 46, 48 each have 80 teeth for the primary set and 16 secondary output teeth and output ring gear 62 has 46 teeth the overall ratio $R_o$ drops to 33.2:1.

Although the invention has hereinabove been described with respect to the illustrated embodiments, it will be understood that the invention is capable of modification and variation and is limited only by the following claims.

What is claimed is:

1. A method of operating a rotary diverter valve comprising:
   (a) connecting a sun gear to a drive motor;
   (b) forming a set of planetary gears each having a first and second coaxial set of teeth of different pitch diameter and disposing said gears on a planetary carrier and driving said second set of teeth with said sun gear;
   (c) engaging said first set of teeth with a fixed ring gear;
   (d) connecting an output ring gear to the rotary diverter valve and driving said output ring gear with said second set of teeth;
   (e) connecting one reaction end of a torsion spring to said planetary carrier and energizing said motor and moving said diverter valve from an initial position to a flow diverting position and winding said torsion spring;
   (f) de-energizing said motor and applying a torque from said spring to said planetary carrier and rotating said carrier and returning said valve to said initial position.

2. The method defined in claim 1, wherein said step of connecting a torsion spring includes disposing a helical spring concentric with said sun gear.

3. The method defined in claim 1, wherein said valve has a generally flat vane configuration.

4. The method defined in claim 1, wherein said step of disposing a set of gears include disposing at least two planetary gear wheels in circumferentially equally spaced arrangement on said carrier.

5. The method defined in claim 1, wherein said step of connecting to drive motor includes connecting to a relatively low voltage direct current motor.

6. The method defined in claim 1, wherein said step of moving said diverter valve to a flow diverter position includes rotating said valve about 90°.

7. The method defined in claim 1, wherein said step of moving said diverter valve to a flow diverter position includes rotating said valve about 90°; and, said step of winding said torsion spring includes winding said spring about 3.6 times.

8. A rotary diverter valve operated in accordance with the method of claim 1 comprising:
   (a) a rotary valve member having an output ring gear drivingly connected thereto and rotatable from an initial position to a flow diverting position;
   (b) a set of planetary gears disposed on a carrier and drivingly engaging said output ring gear and a fixed ring gear;
   (c) a drive motor having a sun gear thereon disposed to drive said set of planetary gears; and,
   (d) a torsion spring operative to be wound by said carrier upon energization of said motor and rotation of said diverter valve to said flow diverting position; and, upon motor de-energization said torsion spring operative to apply a torque to said carrier and to return said diverter valve to said initial position.

9. The valve defined in claim 8, wherein said spring comprises a helical spring disposed concentric with said sun gear.

10. The valve defined in claim 8, wherein said set comprises three planetary gears.

11. The valve defined in claim 8 wherein said set of planetary gears include a first set of teeth engaging said fixed ring gear and a second set of teeth engaging said output ring gear.

* * * * *